United States Patent [19]

Yelton

[11] Patent Number: 5,190,118

[45] Date of Patent: Mar. 2, 1993

[54] AUXILIARY POWER TRAIN AND STEERING SYSTEM FOR A VEHICLE

[76] Inventor: James E. Yelton, P.O. Box 5613, Eugene, Oreg. 97405

[21] Appl. No.: 786,587

[22] Filed: Nov. 1, 1991

[51] Int. Cl.$^5$ .................. B60K 25/06; B60K 26/00
[52] U.S. Cl. .................................. 180/53.2; 180/321
[58] Field of Search ............... 180/53.1, 53.2, 315, 180/320, 321, 324; 366/6

[56] References Cited

U.S. PATENT DOCUMENTS

| | | | |
|---|---|---|---|
| 3,310,293 | 3/1967 | Zimmerman | 259/148 |
| 3,779,608 | 12/1973 | Hatcher et al. | 180/53.2 |
| 4,271,723 | 6/1981 | Shaffer | 180/53.2 |
| 4,527,656 | 7/1985 | Walbridge | 180/321 |
| 4,846,581 | 7/1989 | Osterlund et al. | 180/321 |

FOREIGN PATENT DOCUMENTS 2137572  10/1984  United Kingdom ................ 180/315

Primary Examiner—Mitchell J. Hill
Attorney, Agent, or Firm—James D. Givnan, Jr.

[57] ABSTRACT

Systems are disclosed for the driving of a truck during a paving operation by an operator located alongside the truck and adjacent the paving site. The truck transmission power take off powers a hydraulic pump with pump output being controlled by a pair of solenoid valves with one regulating fluid flow to a hydraulic drive motor driving the truck differential through a gear reduction drive while the other valve controls fluid flow to a hydraulic motor coupled to a steering component of the truck. Both of the solenoid valves are in electrical circuit with switches located exteriorly on the truck for access by the dismounted driver as is a truck brake control. Accordingly steering, braking and fore and aft truck movement may all be accomplished by an operator positioned adjacent the truck.

3 Claims, 1 Drawing Sheet

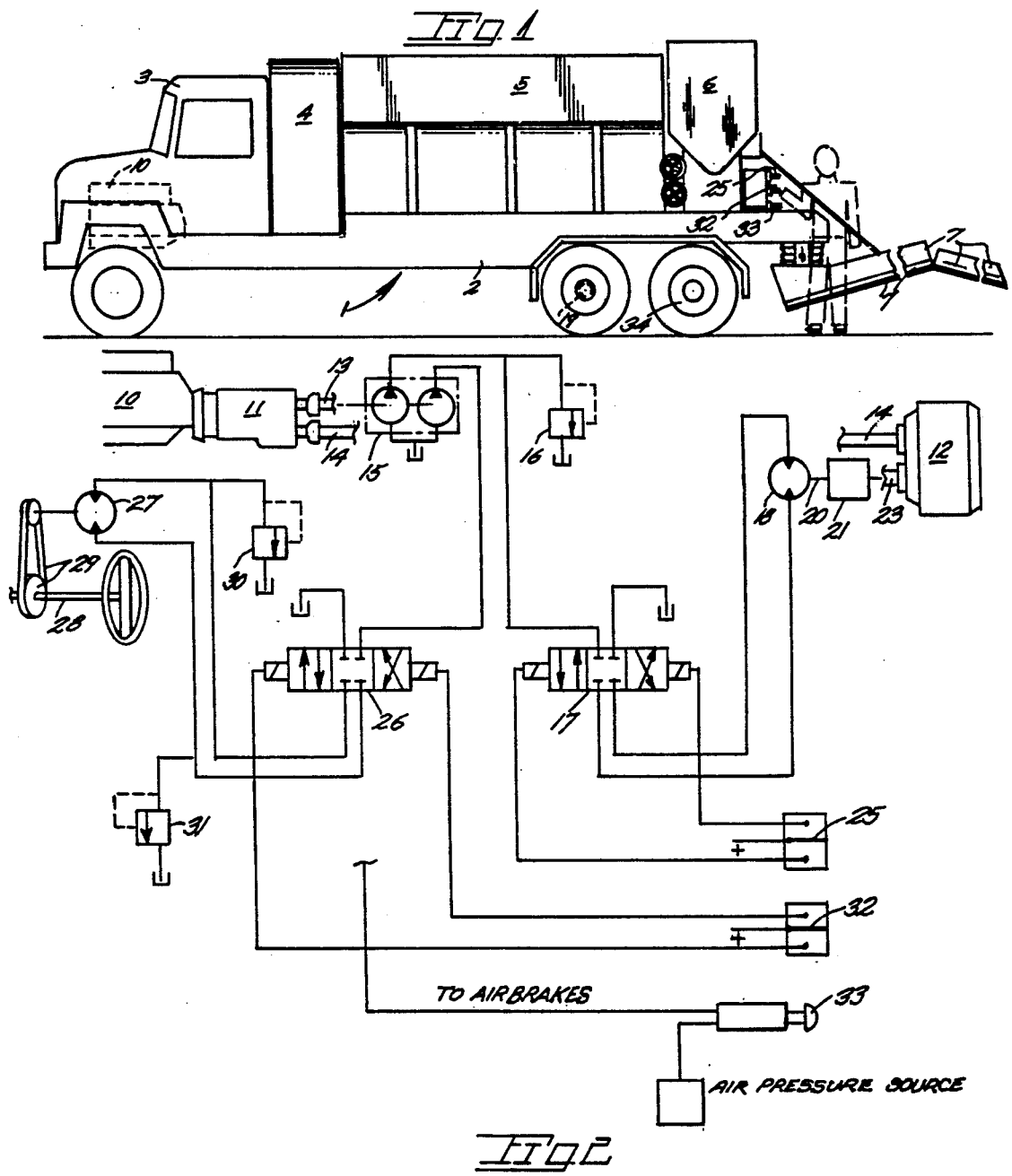

AUXILIARY POWER TRAIN AND STEERING SYSTEM FOR A VEHICLE

BACKGROUND OF THE INVENTION

The present invention pertains generally to an auxiliary power train and controls for operating a vehicle from a location exteriorally of the vehicle.

In use today are trucks equipped with bins and a water tank in which are transported batches or quantities of cement, stone, sand and a quantity of water. Such trucks include a dual purpose conveyor wherein the above concrete ingredients are mixed and discharged onto a prepared ground site. The conveyor is in the form of a positionable discharge chute equipped with an auger. Typically, in discharging the mixed materials, the truck will be moved and the chute will be positioned several times. The driver must necessarily rely on signals from an assistant located at the rear of the truck for subsequent moving of the truck to accomplish discharge of the material in a precise manner to minimize manual effort and hence the labor required in such a delivery operation. In accomplishing a concrete delivery it is common practice to rely on an assistant to instruct the driver as to truck positioning during a delivery operation. Accordingly, the cost of an assistant is incurred or, alternatively reliance on an available party of unknown capability. Further, the imprecise delivery of concrete can necessitate additional paving crew members.

U.S. Pat. No. 3,310,293 discloses a concrete batch truck of the general type which may utilize the present auxiliary power train and controls. U.S. Pat. No. 4,527,656 discloses an auxiliary control system permitting truck operation by a dismounted driver.

SUMMARY OF THE PRESENT INVENTION

The present invention is embodied in an auxiliary power train and control system for a delivery vehicle permitting vehicle travel being controlled by a person stationed adjacent the vehicle.

In the present auxiliary power train hydraulic components are driven by a power take-off arrangement without interference with the truck's primary power train. The primary power train includes a differential of the type manufactured originally with an output shaft for driving a second axle of a vehicle. This output shaft is presently utilized as an auxiliary drive shaft to permit powering of the differential, in a low speed manner, by a reversible hydraulic motor of the present auxiliary power train with motor operation controlled by a solenoid actuated valve. A second hydraulic motor is coupled to the truck's power steering mechanism. Switches controlling valve operation for regulating the two hydraulic motors are located so as to be accessible to a dismounted driver or other person stationed adjacent the truck at a pouring site. Accordingly control of truck movement is by the driver or other person in close proximity to the site being paved. Additionally, a brake control is located at the dismounted driver's station.

Important objectives include the provision of an auxiliary power train for a delivery vehicle for control of same by a dismounted driver; the provision of an auxiliary power train and steering system which can only function when the truck transmission is in neutral and the power take-off engaged to prevent interference with the vehicle's primary power train and steering system; the provision of an auxiliary power train and steering system which provides directional control of the vehicle in forward and reverse directions of travel as well permitting braking of the vehicle all by an operator located alongside the vehicle; the provision of an auxiliary power train and steering system which permits a driver to closely monitor the delivery of concrete to a pouring site while controlling truck travel and direction.

BRIEF DESCRIPTION OF THE DRAWINGS

In the drawings:

FIG. 1 is a side elevational view of a concrete batch truck equipped with the present invention;

FIG. 2 is a combined hydraulic and electric schematic of the present invention.

DETAILED DESCRIPTION OF THE PREFERRED EMBODIMENTS

With continuing attention to the drawings wherein the applied reference numeral 1 indicates generally a truck which may be of the type capable of transporting, in separate bins and a tank, cement, sand, stone particulate and a quantity of water and provide for mixing of same during discharge at a paving site.

A truck chassis 2 supports a cab 3 provided with the customary controls for vehicle travel. Rearward of cab 3 is a water tank 4, a bin 5 which is internally partitioned to carry sand and stone, the discharge of which is regulated by positionable gates. A cement bin at 6 is similarly equipped with a positionable gate. The gates, when set, permit bin discharge in selected proportion onto a chassis carried conveyor belt for discharge of the concrete components into a positionable chute 7 equipped with an auger for the mixing and delivery of the concrete ingredients to the prepared site. The foregoing is intended to be a general description of one type of vehicle in which the present invention may be utilized and should not be construed to mean that the present system is limited to use with any specific type of vehicle.

The vehicle's engine 10, transmission 11 and differential 12 constitute parts of the primary power train as well as parts of the auxiliary power train. A drive shaft 14 couples transmission 11 to differential 12 later described. A power take-off 13 of transmission 11 is powered when the transmission is in neutral which assures present system operation without possible interference with the primary power train.

Power take-off 13 is suitably coupled a fixed displacement, two segment hydraulic pump 15 of the auxiliary power and steering system. A portion of pump output i.e., from the second segment, powers an auxiliary steering system as later described. A piloted relief valve is at 16. With attention particularly to the auxiliary power train such additionally includes a four way, solenoid valve 17 controlling a fluid flow to either side of a reversible hydraulic motor 18. Additional valve positions provide reverse fluid flow directions to motor 18 as well permit return of the output of pump 15 to the system reservoir. An output shaft 20 of hydraulic motor 18 is in driving engagement with a gear reduction box 21 which provides approximately a 5 to 1 reduction for the driving of vehicle differential 12 and a set of axles as at 19. A suitable differential is manufactured and sold by the Eaton Company and is identified as Model DS406-P. Such differentials include an output shaft to drive a second axle which output shaft is presently utilized as a auxiliary drive shaft and is indicated at 23 to power differential 12. Primary power drive train shaft 14 is free to rotate during auxiliary power train operation as transmission 11 at this time is in neutral with engine 10 running at idle speed. The present auxiliary power train, in the present embodiment, provides a vehicle speed of approximately forty feet per minute. Motor control solenoid valve 17 is controlled by a self centering toggle switch at 25 to control motor direction.

With attention now to the auxiliary steering system, a four way, solenoid actuated steering valve at 26 serves to direct a portion of the output of pump 15 to a reversible steering motor 27 of the piston type. The motor is coupled to a steering mechanism component 28 of the truck such as by a sprocket and roller chain arrangement at 29. A suitable steering motor is a piston motor manufactured by Volvo as Model F-11. Relief valves at 30 and 31 assure the limiting of pressure so as to at all times permit the overriding of the auxiliary steering system by a vehicle primary power steering system. Toward this end, either relief valve 30 or 31 will unload upstream fluid pressure in the event normal operation of steering motor 27 is mechanically interrupted by manual operation of the truck steering system.

Steering valve 26 is controlled by a self centering toggle switch 32. Both the auxiliary drive and steering toggle switches 25 and 32 are located at the rear of the vehicle to permit switch operation by an operator, such as the dismounted driver, stationed adjacent the rear of the vehicle to monitor concrete delivery.

Also located at the rear of the vehicle and grouped with the above switches is a manually activated flipper type air valve 33 to permit momentary release of spring biased truck parking brakes which act on rear axle mounted wheels at 34.

A suitable embodiment of the present auxiliary power train and steering system includes the following components which are set out for purposes of description and without limiting present patent coverage to specific components:

Transmission 11 with PTO drive: Chelsea 812XKAHXA3XD
Hydraulic pump 15: Denison Vane Type, Model 16DC02800
Two segments: 35gal/min for steering system 25 gal/min for remote drive system
Hydraulic drive motor 18: Ross, ME 210103 AAA
Gear reduction box 21: HECO, Model 16 5.2 to 1 reduction
Differential axle 12: Eaton Model DS406-P
Remote steering motor 27: Volvo, Model F-11, piston type
Drive & steering valves 17 and 26: Denison, 4-Way, Model SUD 3D01
SUD 3D02
Solenoids 12 V
Remote brake control 33: Bendix, Model TW-1, flipper valve
Drive & steering switches 25 and 32: 12 V self-centering toggle switches The present embodiment of the invention permits truck travel up six percent grades. Also the dismounted operator may view the blind side of the vehicle by the installation of a suitable mirror on the blind side. Fore and aft truck movement is at a rate of forty feet a minute or so, as noted above, which along with audible warning devices assures safe operation of the vehicle. During a paving operation the delivery chute 7 is positionable both laterally and vertically by conventional existing chute controls on such trucks in the proximity of the earlier described controls which constitute part of the present invention.

While I have shown but one embodiment of the invention, it will be apparent to those skilled in the art that the invention may be embodied still otherwise without departing from the spirit and scope of the invention.

Having thus described the invention, what is desired to be secured by a Letters Patent is,

I claim:

1. An auxiliary power train and an auxiliary steering system for a truck to enable positioning of the truck by an operator located adjacent the truck, said auxiliary power train and auxiliary steering system comprising,
   an engine,
   a transmission driven by said engine, said transmission including a power take off,
   a differential including an auxiliary drive shaft,
   a hydraulic pump coupled to said power take off,
   a first hydraulic motor,
   gear reduction means coupling said first hydraulic motor to the auxiliary drive shaft of the differential,
   a second hydraulic motor,
   means coupling said second hydraulic motor to a steering component of the truck,
   first and second solenoid actuated valve means for controlling fluid flows from said hydraulic pump to said first and second hydraulic motors for powering the truck differential and said steering component of the truck,
   electrical controls in circuit with said first and second solenoid valves, said electrical controls located at a rearward location on the vehicle and accessible to an operator stationed adjacent the vehicle, and
   truck brake control means located at said rearward location.

2. The auxiliary power train and auxiliary steering system claimed in claim 1 wherein said differential is alternatively driven by a truck drive shaft and said auxiliary drive shaft.

3. The auxiliary power train and steering system claimed in claim 1 wherein said truck brake control means includes an air valve in communication with a source of air pressure to operate truck brake components.

* * * * *